No. 664,619. Patented Dec. 25, 1900.
E. B. BOGGS.
AUTOMATIC FUR SCALE.
(Application filed Aug. 24, 1900.)
(No Model.) 2 Sheets—Sheet 1.
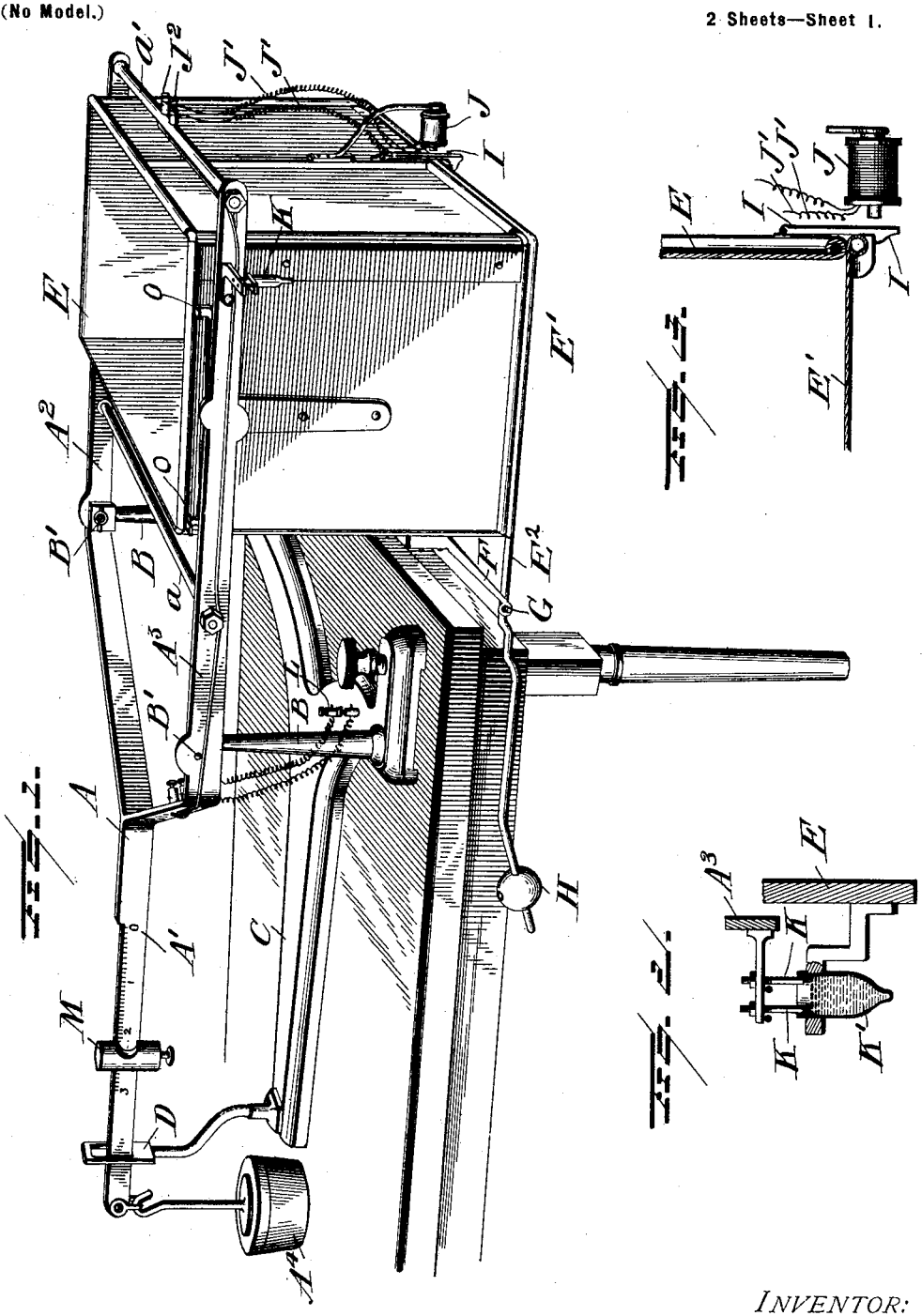
WITNESSES:
INVENTOR:
E. Brenton Boggs,
BY Sturtevant & Greeley
Attorneys

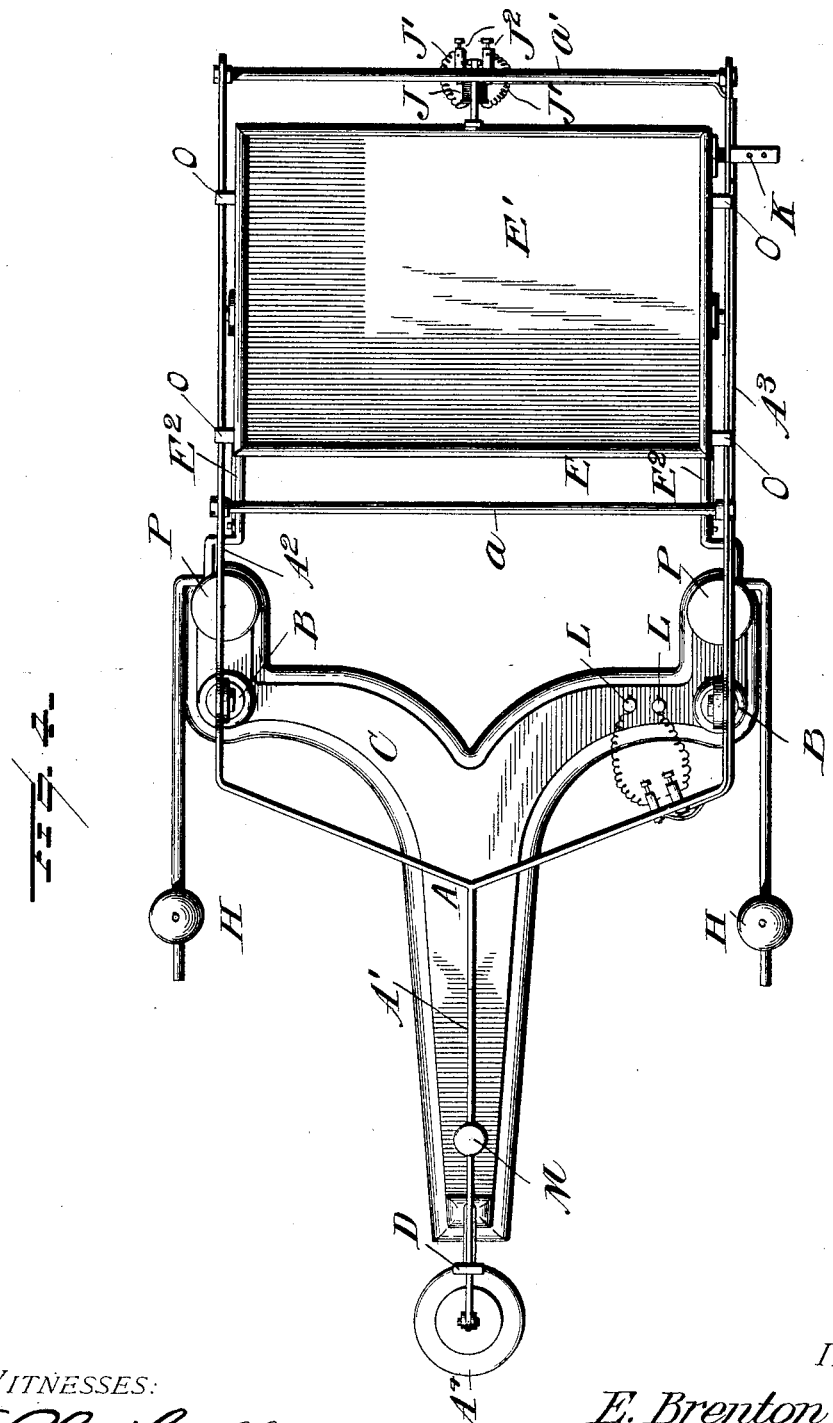

UNITED STATES PATENT OFFICE.

EDWARD BRENTON BOGGS, OF NEW YORK, N. Y., ASSIGNOR TO THE E. & T. FAIRBANKS & COMPANY, OF ST. JOHNSBURY, VERMONT.

AUTOMATIC FUR-SCALE.

SPECIFICATION forming part of Letters Patent No. 664,619, dated December 25, 1900.

Application filed August 24, 1900. Serial No. 27,937. (No model.)

*To all whom it may concern:*

Be it known that I, EDWARD BRENTON BOGGS, a citizen of the United States, residing at New York, in the county of New York, State of New York, have invented certain new and useful Improvements in Automatic Fur-Scales, of which the following is a description, reference being had to the accompanying drawings and to the letters of reference marked thereon.

My invention relates to scales for weighing definite quantities of material so arranged that upon the deposit in the scale pan or hopper of the required quantity the scale pan or hopper is automatically caused to discharge its load.

My invention is particularly designed to be used in connection with a hat-forming machine to weigh the amount of fur required for each hat; and it consists in the construction and arrangement hereinafter described and claimed by which this purpose is carried out.

In the accompanying drawings, which form a part of this specification, Figure 1 is a perspective view of my improved scale. Fig. 2 is a detail view showing the contact-points and mercury-cup, on an enlarged scale. Fig. 3 is a detail view showing the latch and releasing-magnet, on an enlarged scale; and Fig. 4 is a plan view.

Referring to the drawings, A is the scale-beam, having the arms A', A², and A³. The scale-beam is pivotally supported at B' B' by upright posts B, extending upward from the base C, as shown, the pivots being carried by the arms A² and A³.

The arm A' of the scale-beam is graduated and on it is movably supported the poise M. At the outer end of the arm A' is hung the weight A⁴. The travel of the beam is limited by the tip-loop D, extending upward from the base C. Between the arms A² and A³ extend the cross-rods $a$ and $a'$. Within the inclosure formed by these cross-rods and the arms A² and A³ is pivotedly supported from the arms a scale pan or hopper E. This scale pan or hopper has a swinging bottom E', carried by rods E², provided with pivots G, supported in brackets F, carried by the hopper. On the outer ends of the rods E² are adjustably secured weights H, which are sufficiently heavy to throw the bottom upward when the hopper is empty. On the side of the hopper opposite the pivots G is placed a pivoted catch I, arranged to catch and hold the bottom in place when it is thrown upward into place by the weights H.

In order to withdraw the catch I, so as to permit the bottom of the hopper to drop to discharge the contents of the hopper, I provide an electromagnet J, so placed that when a current of electricity is passed through its coils it will attract the catch I, this catch being made of magnetic metal, and draw it away from engagement with the edge of the bottom.

J' represents wires leading to the magnet J from binding-screws J², carried by the cross-rod $a'$ and secured to the ends of wires which extend along the arm A³ and to a point in rear of the pivots and thence extend downward to the base C, where they are secured to binding-posts L L, with which a battery (not shown) is connected. One of these wires may be continuous, but the other is broken at a point near the outer end of the arm A³ and is provided with contact-points K K, which are spaced a short distance apart and extend downwardly. On the side of the scale pan or hopper E, a short distance below the contact-points K when the scale pan or hopper is in normal elevated position, is arranged a mercury-cup K', adapted to receive the contact-points K when the scale pan or hopper is depressed.

The scale pan or hopper being pivoted, as shown, near its upper edge will always maintain a substantially perpendicular position, and so long as the weight of the material in the scale pan or hopper is not sufficient to overbalance the poise and weight at the other end of the scale-beam the arms A² and A³ will remain substantially horizontal and the contacts K will be above the mercury-cup K'. As soon as the weight in the scale pan or hopper overbalances the poise and weight the scale-pan will descend, and the outer ends of the arms A² and A³, turning on the pivots B', will drop below the horizontal and will bring the contacts K into the mercury-cup K', closing contact through the wires and permitting a current to pass through the coils of the magnet J, causing it to withdraw the catch I and permit the bottom of the scale-pan to drop and the material in the scale-pan to be discharged. As soon as the scale-pan is empty it will be raised to normal position by the weight and poise at the rear end of the scale-beam, the contacts K will be raised out of the mercury-cup, and the bottom of the scale pan or hopper will be returned to position by the weights H and will be held in closed position by the catch I. The operation may then be repeated.

P P are leveling-screws for leveling the base of the scale.

O O are stops carried by the scale pan or hopper in the path of movement of the arm $A^3$ for the purpose of preventing too great movement of the scale-pan relative to the scale-beam.

While I have described my invention as particularly adapted to weighing fur for hats, it is evident that it is adapted for weighing any other substance.

Having thus described my invention, what I claim, and desire to secure by Letters Patent, is—

1. The combination with a scale-beam, of a scale pan or hopper pivotally supported by the scale-beam and having a hinged bottom, a latch for holding said bottom in closed position, an electromagnet carried by the scale pan or hopper for releasing the latch, a normally open electric circuit, contact-points carried by the beam and means carried by the scale pan or hopper for closing said circuit, substantially as described.

2. The combination with a scale-beam, of a scale pan or hopper pivotally supported by the scale-beam and having a hinged bottom, a latch for holding said bottom in closed position, an electromagnet carried by the scale pan or hopper for releasing the latch, a normally open electric circuit, contact-points carried by the beam, and a mercury-cup carried by the scale pan or hopper adapted to receive said contact-points and close the circuits when the beam is depressed, substantially as described.

3. The combination with a base, having the posts B and a scale-beam having the arms $A^2$ and $A^3$ and the graduated arm $A'$ pivotally supported on said parts, of a scale pan or hopper pivotally supported by the arms $A^2$ $A^3$ and having a swinging bottom, a catch carried by the scale pan or hopper for retaining the bottom in place, an electromagnet carried by the scale pan or hopper for releasing said catch, a normally open circuit, contact-points carried by the scale-beam and means carried by the scale pan or hopper for closing said circuit to actuate the electromagnet, substantially as described.

In testimony whereof I affix my signature in presence of two witnesses.

E. BRENTON BOGGS.

Witnesses:
ANNA T. MALLON,
E. H. BOARDMAN.